United States Patent
Arnold et al.

(10) Patent No.: US 10,397,314 B2
(45) Date of Patent: Aug. 27, 2019

(54) LATENCY MANAGEMENT AND ADVISING TOOL FOR A DATABASE MANAGEMENT SYSTEM

(71) Applicant: International Business Machines Corporation, Armonk, NY (US)

(72) Inventors: Jason K. Arnold, Chicago, IL (US); Henry E. Calzaretta, Lisle, IL (US); Gary W. Crupi, Pewaukee, WI (US); Shantan Kethireddy, Chicago, IL (US); Dylan S. Murphy, Newtown, MA (US)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 14/950,919

(22) Filed: Nov. 24, 2015

(65) Prior Publication Data
US 2017/0149870 A1    May 25, 2017

(51) Int. Cl.
*H04L 12/26* (2006.01)
*H04L 29/08* (2006.01)

(52) U.S. Cl.
CPC ........ *H04L 67/101* (2013.01); *H04L 43/0852* (2013.01)

(58) Field of Classification Search
USPC ........................................................ 709/224
See application file for complete search history.

(56) References Cited

U.S. PATENT DOCUMENTS

| | | | |
|---|---|---|---|
| 8,386,419 B2 | 2/2013 | Yalamanchilli | |
| 2005/0281279 A1* | 12/2005 | Dennison | H04L 47/50 370/412 |
| 2006/0200507 A1* | 9/2006 | Holenstein | G06F 11/2048 |
| 2009/0070330 A1* | 3/2009 | Hwang | G06F 16/2477 |
| 2009/0300073 A1* | 12/2009 | Bourbonnais | G06F 16/273 |
| 2011/0197032 A1 | 8/2011 | Patey | |
| 2012/0078848 A1* | 3/2012 | Jennas, II | G06F 11/2064 707/649 |
| 2014/0101225 A1* | 4/2014 | Abu-Libdeh | H04L 41/5096 709/203 |

(Continued)

FOREIGN PATENT DOCUMENTS

CN    103488700 A    1/2014

OTHER PUBLICATIONS

Ratnasamy et al., "GHT: A Geographic Hash Table for Data-Centric Storage," Sep. 2002, pp. 78-87, Proceedings of the 1st ACM International Workshop on Wireless Sensor Networks and Applications.

*Primary Examiner* — Hermon Asres
(74) *Attorney, Agent, or Firm* — Daniel Simek; Hoffman Warnick LLC

(57) ABSTRACT

A system, method and program product for providing latency management for use with a database management system. A system is disclosed having: a system for capturing and storing a maximum latency (ML) whenever a derived source is created from a source data; a system for determining a difference between a last refresh timestamp of the source data and the last refresh timestamp of the derived source in response to a query; and a system for causing the source data to be used in response to the difference being greater than the ML, and for causing the derived source to be used in response to the difference being less than the ML.

14 Claims, 3 Drawing Sheets

(56) References Cited

U.S. PATENT DOCUMENTS

2014/0114916 A1  4/2014  Szabo et al.
2014/0258209 A1  9/2014  Eshleman et al.
2015/0019575 A1  1/2015  Dayon et al.
2015/0088812 A1  3/2015  Ziauddin et al.

* cited by examiner

LATENCY MANAGEMENT AND ADVISING TOOL FOR A DATABASE MANAGEMENT SYSTEM

TECHNICAL FIELD

The subject matter of this invention relates to database management systems (DBMS), and more particularly to a system and method of providing latency management and advising in a database management system.

BACKGROUND

Many large information management entities and cloud providers are looking at Massively Parallel Processing (MPP) appliances as well as derived data sources to offload central processing unit (CPU) intensive workloads. This has several benefits as CPU activity can be offloaded from "expensive" environments onto cheaper solutions (where expense is based on CPU consumption). Queries can also be offloaded to environments that are custom built to handle those types of queries.

The offload of queries is generally managed by a DBMS optimizer or by some application level logic to determine: (1) if the data exists on the target environment; (2) if the syntax of the query is supported by the target environment; (3) if the query is well suited for the environment (e.g., through costing optimization); and (4) if any applicable configuration parameters, settings, or environment variables allow routing to the environment.

In order for these appliances or offload sources to be able to execute such "offloaded" queries, copies of the data must be created and refreshed at the offload source. This can be done through a number of load options that will each lead to varying degrees of data latency in the data copies, in which data latency is defined as the data currency between a source table and a derived source. Each option has a different cost. For instance, data replication is often costlier than doing a nightly bulk load of data. Therefore, most entities will replicate a subset of the data and choose other load options for the remainder of the data. The decision on which option to use is driven by the needs of the application user, and the cost/benefit of maintaining the data at the requested latency.

A significant problem for users wishing to take advantage of accelerators or other secondary data sources is that database administrators (DBAs) have difficulty determining when and how best to create additional copies of data (i.e., derived sources) on those facilities. Today, determining whether a query can be offloaded to a secondary source is based on a number of parameters. One of the most important of those parameters is the data latency that the end user can tolerate. This latency tolerance must be directly communicated to the DBA's. If it is not communicated, the application's queries will access the source data. If the latency goal is communicated to the DBA, the DBAs still have no way to decide which load strategy they should use, other than to cater to that application user's specific need. This is problematic in that one user may require a refresh level or latency of less than one day, whereas another user may require a latency of less than one hour.

Depending on the cost of copying data to the offload sources and the value derived from offloading queries in the application, it may, e.g., be beneficial to maintain: a derived source with less than one hour latency to cater to queries in all applications; maintain a derived source with less than one day latency to cater to queries in a single application, and allow queries from other applications to go against the source data; or allow queries from all applications to go against the source data.

This decision really depends on the cost of the various data copy options, and the benefit from being able to offload each application's queries. The benefit can only be determined by looking at the number of queries that can tolerate a specific latency level, determining how many of those queries are candidates for offload, and then looking at the business benefit (e.g., cost savings, performance improvements, batch window shortening, etc.) from offloading those queries.

Significant challenges DBAs or cloud providers are having include:

I. The current method(s) of determining a data replication/refresh strategy for derived sources typically does not take into account the return on investment (ROI) from creating those derived sources. Much of the cost data (e.g., load process cost) is typically not available. Because of this, creation/maintenance of the derived sources may end up costing the organization rather than creating value. Creating a load/replication strategy should take into account: (1) Cost of each of the load option (including network and target specific apply costs); (2) The minimum latency that can be achieved with each load option; and (3) The number of queries and the CPU/elapsed time that can be offloaded for each load option.

II. DBA's do not have access to the aggregate data source latency requirements of the applications/incoming queries for each data source. The aggregate requirements are important to understand the value that can be generated by creating/maintaining the derived source (e.g., data source, number of queries, aggregate query CPU time, aggregate query response time, latency tolerance threshold, etc.).

III. DBA's do not have a way to analyze individual queries based on latency requirements. This is important to understand which queries in a latency group are capable of being offloaded. Only those that can be offloaded will contribute to the "value" component of an ROI computation. Queries may not be candidates for offload because of low estimated CPU/run cost or the syntax not supported in the offload environment.

Today, the communication of latency goals between the application teams and the DBAs is generally through direct communication (if at all). Thus, assuming a new query is developed that requires a lower latency, this would have to be communicated between the application teams and the DBA, meaning that the application teams have to be knowledgeable about the underlying data. In cases where such communication does not occur, the workload is defaulted to the source data because the application teams are unaware that making latency requirements known could reduce costs. For Materialized Query Tables (MQTs), the latency expectations can be driven using the "current refresh age" and the "current maintained table types for optimization" special registers. However, those only help the optimizer match the query request to already existing system maintained MQTs. It does not help advise the DBA on a table creation and loading strategy for derived sources based on latency goals. Moreover, because the optimizer canning make runtime decisions, DBMS driven MQT/derived source matching is not possible with static SQL. This is a major challenge, i.e., knowing how to refresh derived sources and segment workloads in such a way that applications that need real time data continue to run against the operational data, while applications that can tolerate latency are run against the derived source when possible and appropriate.

By giving the DBAs knowledge of application level latency requirements rolled up by data source, a cloud provider or search optimization provider could make copies of data available on lower cost solutions (cost of storage, cost of processing, cost of maintenance, etc.) and re-route application requests to the lowest cost environment based on latency expectations.

SUMMARY

Aspects of the disclosure provide a system and method of providing latency management and advising. The present solution, e.g., allows application users to supply information about the maximum refresh delta that can be tolerated for the queries in the application, where the delta is the difference in refresh age between the source data and a derived source's data. It also aggregates the data by data source, latency threshold, and total number of queries that want a level of latency (with drill down features to each query that can provide more detailed query information). The solution takes into account the different load options, the cost of each load option (capture/propagate/apply), and the minimum latency that can be achieved by each option for each data source. Also, it can determine how many queries can be covered using each of the load options (and the associated CPU time and elapsed time).

A first aspect discloses a latency management system for use with a database management system, comprising: a system for capturing and storing a maximum latency (ML) whenever a derived source is created from a source data; a system for determining a difference between a last refresh timestamp of the source data and the last refresh timestamp of the derived source in response to a query; and a system for causing the source data to be used in response to the difference being greater than the ML, and for causing the derived source to be used in response to the difference being less than the ML.

A second aspect discloses a method of providing latency management within a database management system, comprising: capturing and storing a maximum latency (ML) whenever a derived source is created from a source data; determining a difference between a last refresh timestamp of the source data and the last refresh timestamp of the derived source in response to a query; and causing the source data to be used for the query in response to the difference being greater than the ML and for causing the derived source to be used for the query in response to the difference being less than the ML.

A third aspect discloses a computer program product stored on a computer readable storage medium, which when executed by a processor, provides latency management for a database management system, the computer program product comprising: programming instructions for capturing and storing a maximum latency (ML) whenever a derived source is created from a source data; programming instructions for determining a difference between a last refresh timestamp of the source data and the last refresh timestamp of the derived source in response to a query; and programming instructions for causing the source data to be used for the query in response to the difference being greater than the ML and for causing the derived source to be used for the query in response to the difference being less than the ML.

BRIEF DESCRIPTION OF THE DRAWINGS

These and other features of this invention will be more readily understood from the following detailed description of the various aspects of the invention taken in conjunction with the accompanying drawings in which.

Figure 1:
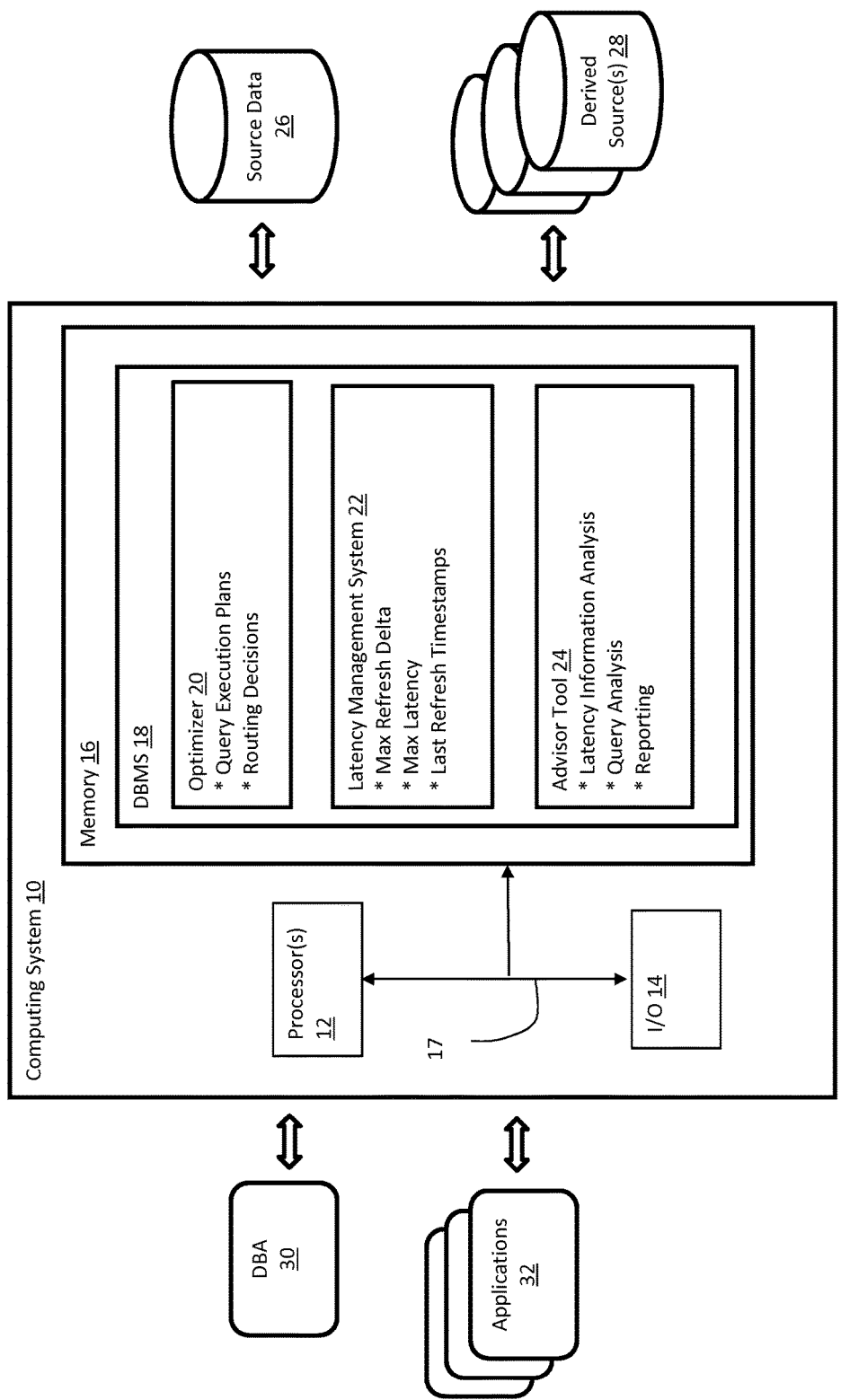
FIG. 1 shows a computing system having a database management system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a computing system 10 having a database management system (DBMS) 18 that manages source data 26 and derived sources 28. Derived sources 28 may include any type of data, e.g., copies, tables, MQTs, etc., obtained from the source data 26. As shown, DBMS 18 includes an optimizer 20 that determines the most efficient manner to execute queries from one or more applications 32, typically based on query execution plans. As noted, one challenge with derived sources 28 is understanding and managing the latency constraints imposed by applications 32, i.e., will a derived source 28 meet the latency requirements for a given application 32.

To address this, DBMS 18 includes a latency management system 22 that tracks and manages latency information for derived sources 28, such as a maximum refresh delta, a maximum latency, and a last refresh timestamps. This information can then be used by optimizer 20 to make routing decisions regarding whether to use source data 26 or a derived source 28. (In an alternative approach, latency management system 22 could be incorporated in the optimizer 20.) In addition, the latency information can also be used by an advisor tool 24 that analyzes the latency information, queries, CPU costs, etc., to provide reporting and feedback to the DBA 30 and application users.

Figure 2:
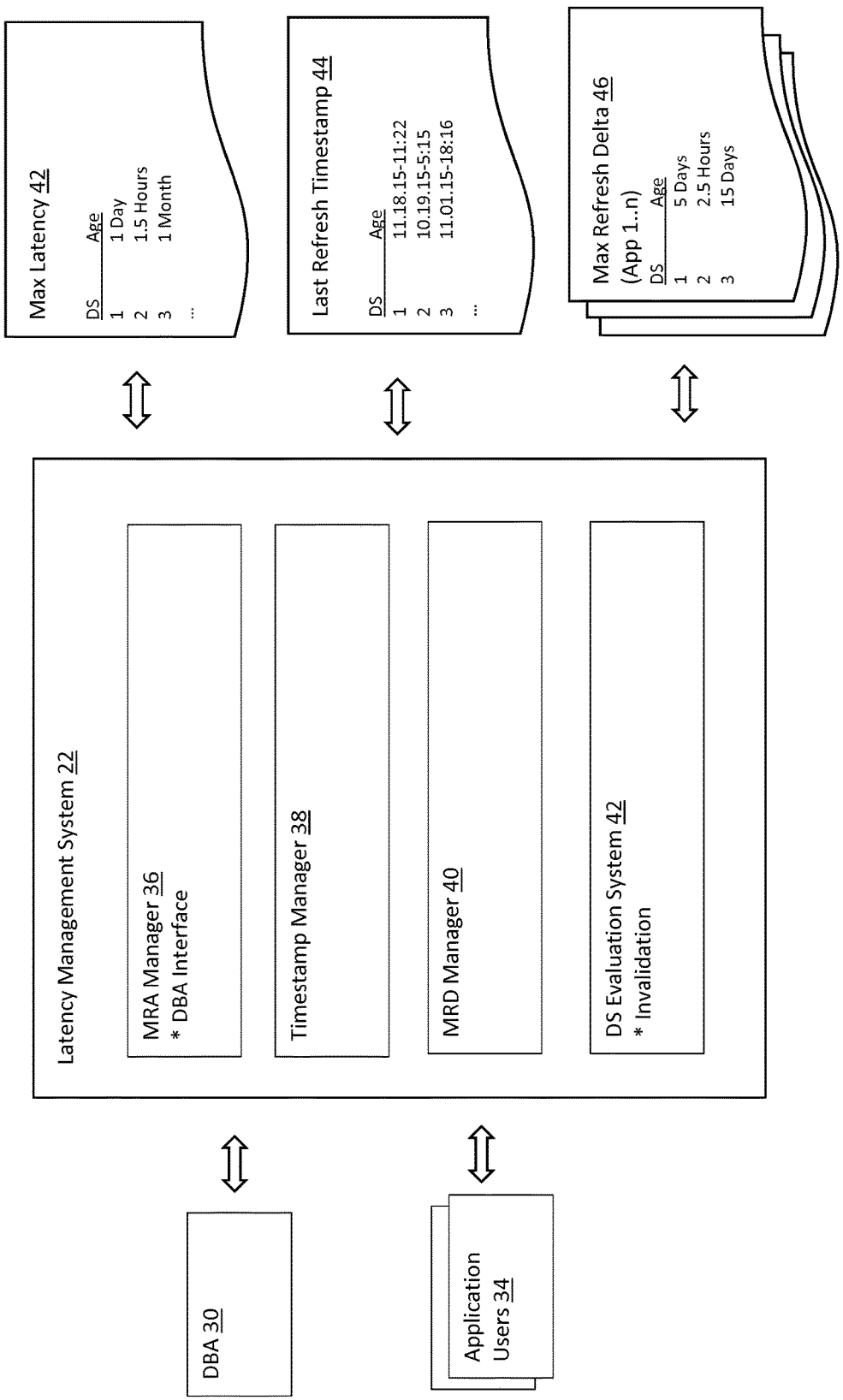
FIG. 2 shows a latency management system according to embodiments.

FIG. 2 depicts latency management system 22 of FIG. 1 in further detail. In this illustrative embodiment, latency management system 22 includes a maximum latency (ML) manager 36; a timestamp manager 38; a maximum refresh delta (MRD) manager 46; and a derived source (DS) evaluation system 42.

ML manager 36 captures the maximum latency 42 of each derived source 28 when the derived source 28 is created. The ML 42 may for example be provided by the DBA 30 and specifies the maximum data latency that can be tolerated for a derived source 28. ML 42 thus provides an informational referential constraint for each derived source, which will be enforced by the DBA 30, as opposed to the DBMS 18.

Timestamp manager 38 is responsible for managing last refresh timestamps 44 information associated with each derived source 28 and the source data 26. Many DBMS's 18 provide facilities for maintaining statistics for relational database tables on the last refresh timestamp 44, and store this information in real time statistics or in a catalog table and expose this information through an API (application programming interface). A DBMS query parser can be readily modified to accept a new maximum latency syntax. Query execution of a CREATE or ALTER statement can cause DBMS catalog tables to be updated with the table information. These catalog tables can also be updated with a column for the maximum latency.

In addition, a utility may be included in timestamp manager 38 so that the last refresh timestamp of the derived source can be updated by a DBA 30. For instance, if an Extract, Transform and Load (ETL) refresh job is run and there are no changes to propagate, the DBA 30 will be able to update the last refresh timestamp of the derived source to the curtime( ).

DS evaluation system 42 provides a mechanism for evaluating ML 42 data and last refresh timestamp 44 data to determine, e.g., whether a particular derived source 28 is invalid. A derived source 28 will be invalidated by the derived source DBMS if: source data last refresh timestamp−derived source last refresh timestamp>maximum latency. What this determines is whether the derived source 28 has not been updated within the defined maximum latency 42 and there have been changes at the source data 26 since the last time the derived source 28 was refreshed. For example, this could occur if the source data 26 has changed, and a nightly ETL update job failed. Note that the onus is on the application user 34 to ensure data consistency with whatever copy technology they are using.

The equation above computes the difference in the last refresh between source data and derived source, and then tests it against the user defined maximum latency 42 for the derived source. Consider the following example:
- DBA 30 defined maximum latency 42 for the derived source as 1 day
- The derived source last refresh timestamp 44 is curdate( )−5 days
- The source data last refresh timestamp is curdate( )−4.5 days
- Accordingly, source data refresh timestamp−derived source refresh timestamp=(curdate( )−4.5 days)−(curdate( )−5 days)=(−4.5 days)−(−5 days)=(−4.5 days)+(5 days)=0.5 day refresh delta, which is less than 1 day. Because the refresh delta is less than the specified maximum latency of one day, the derived source may be deemed valid, and usable by the optimizer.

Figure 3:
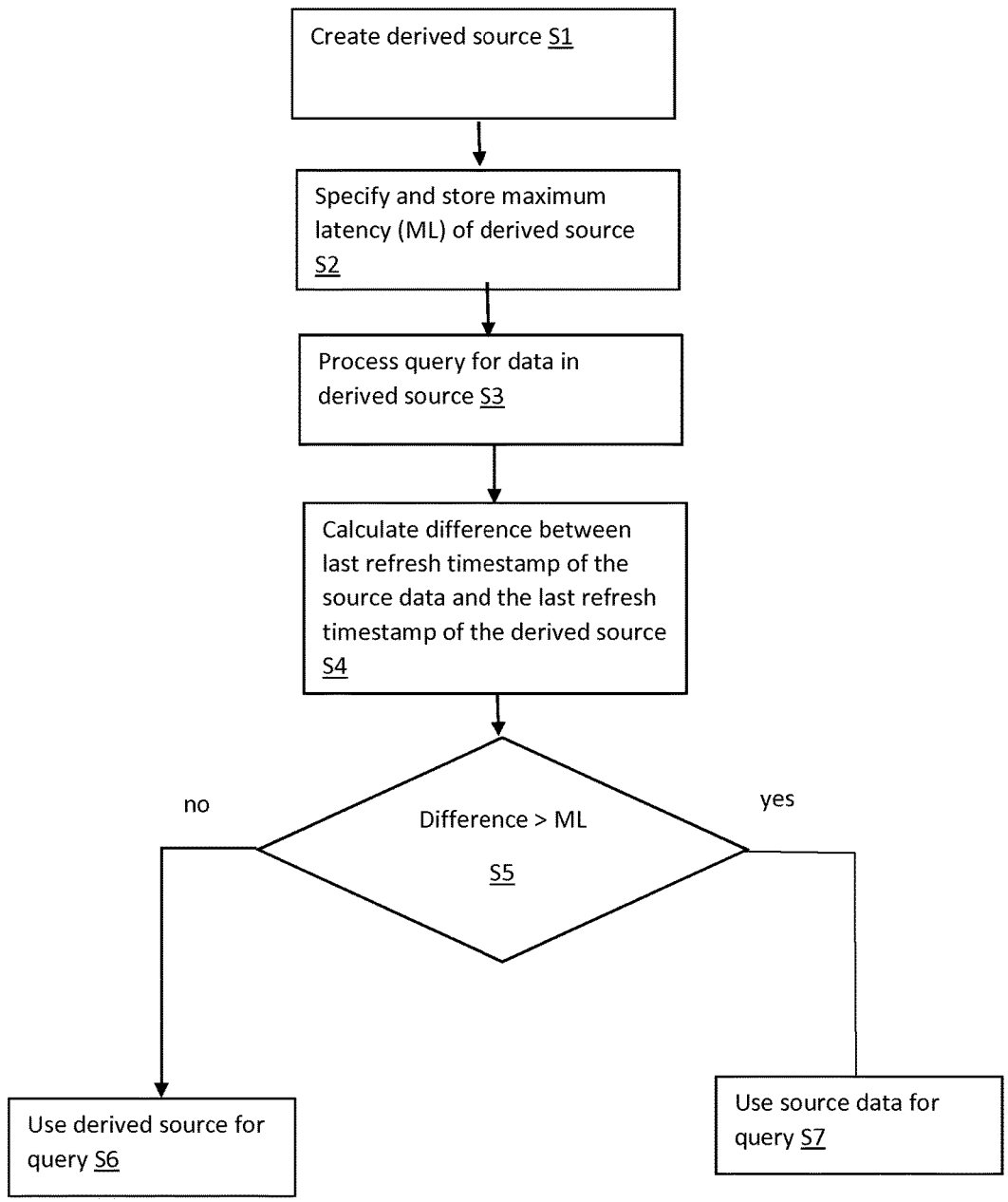
FIG. 3 depicts a flow diagram for implementing latency management according to embodiments.

FIG. 3 depicts a flow diagram of the process. At S1, a derived source 28 is created and at S2, the ML of the derived source 28 is specified. At S3, a query is processed for data in the derived source 28 and at S4 a difference between the last refresh timestamp of the source data 26 and the last refresh timestamp of the derived data 28 is calculated. At S5, a determination is made whether the calculated difference is greater than the specified ML for the derived source 28. If no, then use the derived source 28 for the query. If yes, then use the source data 26 for the query.

Referring back to FIG. 2, also included in latency management system 22 is maximum refresh delta (MRD) manager 40. MRD manager 40 includes an interface for allowing application users 34 to provide the MRD 46 between the source data and derived source for dynamic SQL queries in an associated application. In a typical application, this can be done at the query level, report level, connection level, or data source level via special register setting or profile table options.

The MRD 46 is defined as the difference in refresh age between the source data and a derived source. This limit can be used by optimizer 20 (FIG. 1) to determine if a derived source 28 can be considered in developing the query execution plan. Application users 34 can define the limits for their dynamic queries at different levels of workload granularity (e.g. connection level, package level, query level) and different levels of latency granularity.

As shown in FIG. 1, advisor tool 24 may be implemented to take advantage of the information generated by latency management system 22. For example, for dynamic SQL processing, advisor tool 24 can group user defined latency requirements for a given data source and provide advice on how often to load/refresh copies of data to the various derived sources 28 and by what means. In addition, advisor tool 24 can expose statistics on "long running queries" (where the definition of long running can, e.g., be based on user defined filters) that can take advantage of the various latency groups (real time, 1 min, 5 min, 1 hour, 1 day, 1 month, etc.).

For each table in a query where an MRD was specified, latency advisor 24 can find those specific queries and capture relevant statistical information. Anytime a query is submitted to the DBMS 18, the query will get compiled to verify the syntax, to determine if all of the data sources exist, etc. Many DBMS's maintain a statement cache of all of the different queries that are optimized. This statement cache would be one source of information that advisor tool 24 could step through to look for all queries that specified an MRD special register setting. In lieu of a statement cache, many monitoring tools are available that catalog the necessary query information as well. The drawback of using a monitor is that it has to be setup and starting manually.

In the case where a statement cache is available, advisor tool 24 may be configured to step through all of the statement cache records. It will look for any read only query where the MRD special register was specified, and the cache will maintain a flag for each query entry if the MRD was specified. Namely, where an MRD was specified, it will add an entry to a latency advisor table (e.g., a global temporary table or a physical table) for each table referenced in the query. Each entry may for instance include a fully qualified table name (or a link to the table entry in the DBMS catalog table), the MRD setting, and the query statistics (such as the query, the average CPU/run cost, the maximum CPU/run cost, and the number of executions).

In case where a monitoring tool is utilized, advisor tool 24 would similarly step through the monitor records and gather the query and the aforementioned statistics. Assuming that the monitor records include an individual entry for each time a query was executed, then the advisor tool 24 would have to group by the query statement (without host variables/parameter markers) and aggregate the statistical information. A third option is for the DBMS 18 to maintain a system wide latency advisor temporary table.

During the optimization or execution of a query that specifies the MRD, the query and statistical information is added to the advisor table. The DBMS 18 will either add a new entry or update an existing entry if the query already exists in the table.

In a further aspect, the DBMS query optimizer 20 may use both application level latency inputs, i.e., MRD information, as well as the ML of the potential derived sources to report: each table's latency groups (based on aggregation of MRD information from application users); the number of queries that were included in those groups; the average and total CPU/runtime costs for those queries in the group; a drill down to each of the queries in the group, etc.

This information can thus provide a view of the latency requirements on a table (e.g., the number of queries that expect real time, the number that expect one hour, the number that expect one day), and could be used in batch jobs, e.g., to schedule loads to the various sources. The advisor tool 24 can also provide an estimate on the CPU utilization that would be incurred by the available load/refresh processes.

The advisor tool 24 can thus provide a latency report at the table level. For example, the top level would show the table name as well as statistics about the table. The table information would be captured from the DBMS catalog table. Table statistics would include the table size, record count, and average number of records inserted/updated/deleted per hour. An application user 34 would be able to drill down to the next level which would be grouped by MRD. This level would contain aggregated counts and sums of all the statistical information in that group. The next level would contain the aforementioned query statistics for each query in that MRD group. Within each level, the application user 34 can sort the view ascending or descending by each of the columns. For example:

TABLE A

Table Size:
Table Record Count:
Average number of changes per hour:
Estimated cost for incremental refresh:
Estimated cost for bulk load:
Estimated cost for flash copy:
    Refresh Level: 1 Minute
Number of queries eligible for offload:
Aggregate CPU eligible for offload (sec):
Aggregate elapsed time eligible for offload:
Average CPU eligible for offload:
Average elapsed time eligible for offload:
Query Statistics:
    Query 1: Select count(*) from Table A; average CPU; average run cost; maximum
        CPU cost; maximum run cost; number of executions
    Query 2: Select * from Table A; average CPU; average run cost; maximum CPU cost; maximum run cost; number of executions
Refresh Level: 1 Hour
Refresh Level: 1 Day
Refresh Level: 1 Month Advisor tool 14 may also be used to expose the estimated cost for each data copy option. A load cost algorithm is based on a number of parameters which may include such factors as the data target attributes (e.g., if it involves an MPP environment, an MQT, or a local cached table), the velocity of changes to the source data, the complexity of the changed record(s), the type of updates being done to the underlying source (e.g., reorg/bulk load vs single row update), the type of load (e.g., replication vs flash copy vs unload utility).

Note that just because users of a table only require up to the month latency, this does not mean a table/partition level load is appropriate. That table may only have a handful of small changes each month, so replication of that data may be suitable. Therefore, advice may be dependent not only on aggregate latency requirements but also on the cost of the various load strategies. The information generated by the advisory tool 34 thus provides an understanding the "cost of replication" versus the cost of other load strategies.

In addition, ML information can also be exposed via an application programming interface (API). For example, a technology may be employed that allows application users 34 to define local and remote derived sources to a local DBMS 18. Assuming that the local DBMS 18 is aware that some remote derived sources exist and it has connectivity to those sources, it may use the ML statistics (e.g., via an API call) for each of those derived sources to determine if the derived source is eligible (from a latency perspective) for use to execute the query. The DBMS 18 would do this by comparing the MRD to the derived source's ML and by determining if the source is valid using the processes described herein.

In a further aspect, the latency information may be used to provide two new bind options in static SQL packages. The first would tell the optimizer 20 whether it can consider derived sources 28 for optimization, and also how to react if there is a problem at runtime with the derived source 28. Namely, upon detection of a problem, it can cause an incremental rebind to run on the local DBMS 18 only, or it can fail. The second option is to use the MRD, in which such settings would apply to all queries in a package. The optimizer 20 would be able to choose whether to bind a plan that uses derived sources with a ML less than or equal to the MRD.

It is understood that DBMS 18 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 that may comprise any type of computing device and for example includes at least one processor 12, memory 16, an input/output (I/O) 14 (e.g., one or more I/O interfaces and/or devices), and a communications pathway 17. In general, processor(s) 12 execute program code which is at least partially fixed in memory 16. While executing program code, processor(s) 12 can process data, which can result in reading and/or writing transformed data from/to memory and/or I/O 14 for further processing. The pathway 17 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the DBMS 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A latency management system for use with a database management system, comprising:
   a maximum latency manager that stores a user-defined maximum latency constraint whenever a derived source is created from a source data;
   a timestamp manager that determines a difference between a last refresh timestamp of the source data and the last refresh timestamp of the derived source in response to a query;
   a data source evaluation system that selects the source data to be used in response to the difference determined by the timestamp manager being greater than the maximum latency constraint and selects the derived source to be used in response to the difference being less than the maximum latency constraint; and
   a maximum refresh delta manager that captures and stores a maximum refresh delta when a query is inputted from an application user, wherein the maximum refresh delta defines a maximum latency difference between the source data and the derived source, wherein the maximum refresh delta is provided to an optimizer to determine whether a derived source can be utilized for the query.

2. The latency management system of claim 1, further comprising an advisor tool, wherein the advisor tool groups maximum refresh delta data for each of a plurality of derived sources.

3. The latency management system of claim 2, wherein the advisor tool determines how often each derived source should be updated.

4. The latency management system of claim 2, wherein the advisor tool groups query data as a function of a refresh level.

5. The latency management system of claim 1, wherein the maximum refresh delta is stored in a statement cache.

6. A method of providing latency management for a database management system, comprising:
    storing a maximum latency constraint when a derived source is created from a source data;
    determining a difference between a last refresh timestamp of the source data and the last refresh timestamp of the derived source in response to a query;
    causing the source data to be used for the query in response to the difference being greater than the maximum latency constraint and for causing the derived source to be used for the query in response to the difference being less than the maximum latency constraint; and
    capturing and storing a maximum refresh delta when a query is inputted from an application user, wherein the maximum refresh delta defines a maximum latency difference between the source data and the derived source,
    wherein the maximum refresh delta is provided to an optimizer to determine whether a derived source can be utilized for the query.

7. The method of claim 6, further comprising providing an advisor tool, wherein the advisor tool groups maximum refresh delta data for each of a plurality of derived sources.

8. The method of claim 7, wherein the advisor tool determines how often each derived source should be updated.

9. The method of claim 7, wherein the advisor tool groups query data as a function of a refresh level.

10. The method of claim 6, wherein the maximum refresh delta is stored in a statement cache.

11. A computer program product stored on a non-transitory computer readable storage medium, which when executed by a processor, provides latency management for a database management system, the computer program product comprising:
    programming instructions for storing a maximum latency constraint when a derived source is created from a source data;
    programming instructions for determining a difference between a last refresh timestamp of the source data and the last refresh timestamp of the derived source in response to a query;
    programming instructions for causing the source data to be used for the query in response to the difference being greater than the maximum latency constraint and for causing the derived source to be used for the query in response to the difference being less than the maximum latency constraint; and
    programming instructions for capturing and storing a maximum refresh delta when a query is inputted from an application user, wherein the maximum refresh delta defines a maximum latency difference between the source data and the derived source,
    wherein the maximum refresh delta is provided to an optimizer to determine whether a derived source can be utilized for the query.

12. The computer program product of claim 11, further comprising programming instructions to implement an advisor tool, wherein the advisor tool groups maximum refresh delta data for each of a plurality of derived sources.

13. The computer program product of claim 12, wherein the advisor tool determines how often each derived source should be updated.

14. The computer program product of claim 12, wherein the advisor tool groups query data as a function of a refresh level.

* * * * *